O. J. EISELE.
BOLT AND NUT LOCK.
APPLICATION FILED APR. 16, 1920.

1,365,775.

Patented Jan. 18, 1921.

Inventor:
Otto J. Eisele,
By Frederick V. Winters,
Attorney.

UNITED STATES PATENT OFFICE.

OTTO J. EISELE, OF NEW YORK, N. Y., ASSIGNOR OF ONE-HALF TO JOHN B. KAISER, OF NEW YORK, N. Y.

BOLT AND NUT LOCK.

1,365,775.

Specification of Letters Patent.  Patented Jan. 18, 1921.

Application filed April 16, 1920. Serial No. 374,429.

*To all whom it may concern:*

Be it known that I, OTTO J. EISELE, a citizen of the United States, residing at New York, in the county and State of New York, have invented certain new and useful Improvements in Bolt and Nut Locks, of which the following is a full, clear, and exact specification.

This invention relates to bolt and nut locks, and especially to that type in which a washer is placed between the work and the head of the bolt or nut, as the case may be, said washer having means for engaging both the work and nut or bolt head for preventing relative movement of one with respect to the other.

It is the aim of the present invention to produce a lock washer of simple and improved construction which is durable, easy to apply, certain in its engagement with the parts to be retained, and which may be used over and over again with beneficial results. Other objects of the invention will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
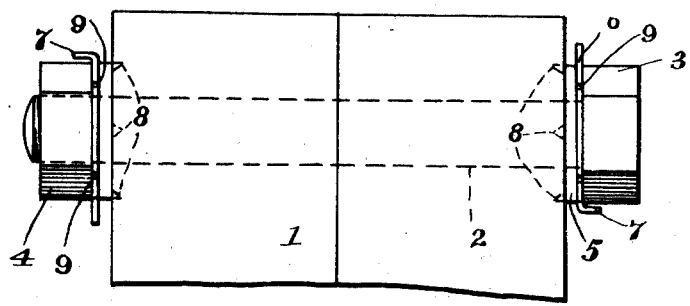
Figure 1 is an elevation of portions of two blocks secured together by a bolt the head and nut of which are locked by washers constructed and applied substantially in accordance with this invention.
Figure 2:
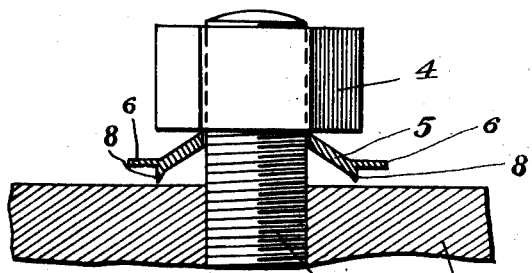
Fig. 2 is a detailed view showing the position of the nut-locking washer before the nut is screwed down.

In Fig. 1 of the drawings, 1 designates two blocks which are shown by way of illustrating some work to be held by the bolt 2 which has the head 3 and nut 4 at opposite ends thereof. The lock washer 5 is initially dished or conical in form, as shown in Figs. 2 and 4, and has a horizontal peripheral flange 6 of reduced thickness. Said flange may be formed into a plurality of separate sections by means of radial slits 9, see Figs. 1 and 5, so that any one or more of said sections may be turned or bent up against the nut or bolt head after the washer is seated, as shown at 7 in Figs. 1 and 3.

Figure 5:
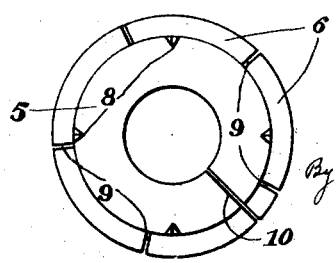

The washer has a plurality of spurs 8 formed at intervals around the same at the junction of the conical body portion 5 and the reduced flange 6, said spurs extending downward and being preferably hardened to a greater extent than the washer itself by any suitable means. A radial slit 10 extends entirely across the washer, as shown in Fig. 5, so that said washer may spread as it is flattened out by the screwing down of the nut. As said nut is screwed down and the washer flattened out from the conical position shown in Fig. 2 to the flat position shown in Fig. 3, the spurs 8 are forced into the surface of the work 1 so as to lock the washer against turning thereon. It will be noted that the initial horizontal position of the flange 6 leaves the spurs entirely free to enter the surface of the work to the full extent of their length without being interfered with by said flange, and that the flattening out of the body of the washer from conical to horizontal position drives said spurs forcibly in with an oblique gouging action which insures the best and most positive engagement thereof with the work.

Figure 3:
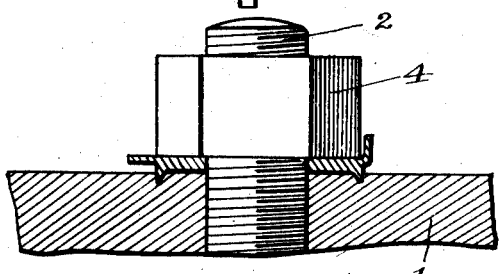
Fig. 3 is a similar view showing how the washer is depressed when the nut is screwed down.
Figure 4:
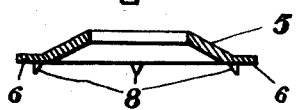
Figs. 4 and 5 are detailed section and under plan views of the washer alone.

After the nut has been screwed down and the washer flattened out, the sections of the flange 6, being thinner than the body of the washer and flush with the upper surface thereof, are spaced away from the work, as shown in Figs. 1 and 3, so that one or more of said sections may be easily pried or bent up against the nut or bolt head, as at 7. The bent up portion or portions 7 may also be readily bent down again for releasing the nut or bolt head when desired, making it possible to use the same washer over again a number of times.

Having thus described my invention, what I claim as new and desire to secure by Letters Patent of the United States is:—

1. A lock washer having a conically shaped body with downwardly projecting spurs at its periphery and a radial slit extending through said body, whereby the washer may be flattened out when a nut is screwed down and the spurs driven into the work with a gouging action, and means on said washer for engaging the side of the nut for locking it against turning.

2. A lock washer having a conically shaped body with downwardly extending spurs at its periphery and a radial slit, whereby said washer may be flattened out when a nut is screwed down and the spurs driven into the work with a gouging action, and a peripheral flange on the washer beyond the spurs for bending up against the nut.

3. A lock washer having a conically shaped body with downwardly extending spurs at its periphery and a radial slit, whereby said washer may be flattened out when a nut is screwed down and the spurs driven into the work with a gouging action, and a peripheral flange of less thickness than the body of the washer extending beyond the spurs and adapted to be bent up against the nut.

4. A lock washer having a conically shaped body with downwardly extending spurs at its periphery and a radial slit, whereby said washer may be flattened out when a nut is screwed down and the spurs driven into the work with a gouging action, and a peripheral flange of less thickness than the body and arranged horizontally at the upper edge of the periphery of the body of the washer where it does not interfere with the action of the spurs, said flange being adapted to have any portion thereof bent up to lock the nut.

In testimony whereof I have signed my name to this specification.

OTTO J. EISELE.